(12) United States Patent
Zheng et al.

(10) Patent No.: US 10,097,838 B2
(45) Date of Patent: Oct. 9, 2018

(54) SYSTEM AND METHOD FOR DEPTH MAP CODING FOR SMOOTH DEPTH MAP AREA

(71) Applicants: Futurewei Technologies, Inc., Plano, TX (US); Santa Clara University, Santa Clara, CA (US)

(72) Inventors: Jianhua Zheng, Beijing (CN); Zhouye Gu, Santa Clara, CA (US); Chen-Xiong Zhang, Plano, TX (US); Nam Ling, San Jose, CA (US)

(73) Assignees: Futurewei Technologies, Inc., Plano, TX (US); Santa Clara University, Santa Clara, CA (US)

( * ) Notice: Subject to any disclaimer, the term of this patent is extended or adjusted under 35 U.S.C. 154(b) by 268 days.

(21) Appl. No.: 14/882,256

(22) Filed: Oct. 13, 2015

(65) Prior Publication Data

US 2016/0105672 A1 Apr. 14, 2016

Related U.S. Application Data

(60) Provisional application No. 62/063,305, filed on Oct. 13, 2014.

(51) Int. Cl.
| | | |
|---|---|---|
| *H04N 19/115* | (2014.01) | |
| *H04N 19/156* | (2014.01) | |
| *H04N 19/136* | (2014.01) | |
| *H04N 19/176* | (2014.01) | |
| *H04N 19/44* | (2014.01) | |
| *H04N 19/597* | (2014.01) | |
| *H04N 19/11* | (2014.01) | |
| *H04N 19/167* | (2014.01) | |

(52) U.S. Cl.
CPC ........... *H04N 19/176* (2014.11); *H04N 19/11* (2014.11); *H04N 19/167* (2014.11); *H04N 19/597* (2014.11)

(58) Field of Classification Search
None
See application file for complete search history.

(56) References Cited

U.S. PATENT DOCUMENTS

| | | | |
|---|---|---|---|
| 2010/0329362 A1* | 12/2010 | Choi | ............... H04N 19/139 375/240.29 |
| 2011/0164677 A1 | 7/2011 | Lu et al. | |
| 2012/0114261 A1 | 5/2012 | Cheon | |

(Continued)

FOREIGN PATENT DOCUMENTS

WO 2014146219 A1 9/2014

OTHER PUBLICATIONS

Chen, Y. et al., "Test Model 9 of 3D-HEVC and MV-HEVC," in JCT3V- I1003, 9th Meeting: Sapporo, JP, Jul. 3-9, 2014, 57 pages.

(Continued)

*Primary Examiner* — Mohammad J Rahman
(74) *Attorney, Agent, or Firm* — Slater Matsil, LLP

(57) ABSTRACT

A method for coding a coding unit that is coded with a single sample value is provided. The method selects a coding pattern from at least two predetermined coding patterns, each of which includes a plurality of boundary neighboring samples of the coding unit that have been reconstructed, and decodes the coding unit according to a value of at least one of the plurality of boundary neighboring samples of the selected coding pattern that is available.

20 Claims, 2 Drawing Sheets

(56) References Cited

U.S. PATENT DOCUMENTS

| | | | |
|---|---|---|---|
| 2013/0003837 A1 | 1/2013 | Yu et al. | |
| 2014/0253682 A1 | 9/2014 | Zhang et al. | |
| 2014/0294061 A1* | 10/2014 | Zhang | H04N 19/597 375/240.02 |
| 2014/0301454 A1* | 10/2014 | Zhang | H04N 13/0048 375/240.12 |
| 2014/0362919 A1* | 12/2014 | Zhou | H04N 19/159 375/240.16 |
| 2015/0003529 A1* | 1/2015 | Thirumalai | H04N 19/597 375/240.14 |
| 2015/0245063 A1* | 8/2015 | Rusanovskyy | H04N 19/597 375/240.12 |

OTHER PUBLICATIONS

Chen, Yi-Wen et al., "3D-CE2: Single depth intra mode for 3D-HEVC," Joint Collaborative Team on 3D Video Coding Extensions of ITU-T SG 16 WP 3 and ISO/IEC JTC 1/SC 29/WG 11, Document: JCT3V-I0095, 9th Meeting, Jul. 3-9, 2014, 4 pages, Meeting, Media Tek Inc., Sapporo, JP.

Bang, Gun et al., "Simplification of single depth intra mode," Joint Collaborative Team on 3D Video Coding Extensions of ITU-T SG 16 WP 3 and ISO/IEC JTC 1/SC 29/WG 11, Document: JCT3V-J0054, Oct. 18-24, 2014, 3 pages, 10th Meeting, ETRI and Kyung Hee University, Strasbourg, FR.

Chen, Yi-Wen et al., "Single color intra mode for content coding," Joint Collaborative Team on Video Coding (JCT-VC-of ITU-T SG 16 WP 3 and ISO/IEC JTC 1/SC 29/WG 11, Document: JCTV-Q0093, 17th Meeting, Mar. 27-Apr. 4, 2014, 7 pages, Media Tek Inc., Valencia, ES.

Lai, PoLin et al., "Non-SccE3 Test D.1 Single Color Mode," cJoint Collaborative Team on Video Coding (JCT-VC) of ITU-T SG 16 WP 3 and ISO/IEC JTC 1/SC 29/WG 11, Document: JCTVC-R0198_r2, 18th Meeting, Media Tek Inc., Jun. 30-Jul. 9, 2014, 7 pages, Sapporo, JP.

* cited by examiner

SYSTEM AND METHOD FOR DEPTH MAP CODING FOR SMOOTH DEPTH MAP AREA

This patent application claims priority to U.S. Provisional Application No. 62/063,305, filed on Oct. 13, 2014, and entitled "System and Method for Depth Map Coding for Smooth Depth Map Area", which is hereby incorporated by reference herein as if reproduced in its entirety.

TECHNICAL FIELD

The present invention relates to video coding, and, in particular embodiments, to a system and method for depth map coding for smooth depth map area.

BACKGROUND

In depth map based rendering 3D video coding, a depth map is coded as a texture view picture into a coded bitstream. However, depth map data show signal characteristics different from natural video data. The most intuitive one is that a depth map includes a lot of smooth areas with similar sample values. For most of the cases, the samples within the smooth area share a same depth value.

In high efficiency video coding (HEVC)-based depth coding, a coding mode termed as a single depth mode is used to efficiently code smooth areas within a picture. The concept of the single depth mode is to simply reconstruct a current coding unit (CU) as a smooth area with a single depth sample value. Thus a smooth area within a depth map may be coded more efficiently through more concise syntax.

To reconstruct a CU coded with the single depth mode, a sample candidate list is constructed by inserting into the candidate list sample candidates derived from neighboring samples of a current CU in a predefined order. Complicated processing is performed to select a best candidate from the candidate list to fill the current CU.

SUMMARY OF THE INVENTION

Technical advantages are generally achieved, by embodiments of this disclosure which describe a system and method for depth map coding for smooth depth map area.

In accordance with an embodiment, a method for decoding a coding unit which is coded with a single sample value is provided. The method selects, by a processing system, a coding pattern from at least two predetermined coding patterns. Each of the at least two coding patterns includes a plurality of boundary neighboring samples that have been reconstructed, and each of the plurality of boundary neighboring samples is a boundary sample of a neighboring coding unit of the coding unit and is immediately adjacent to the coding unit. The method further decodes the coding unit according to a value of at least one of the plurality of boundary neighboring samples of the selected coding pattern that is available. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

For a coding unit coded with a single depth mode, a single depth sample value may be used to reconstruct the coding unit. Conventionally, a complicated process is used to construct a candidate list from which a sample candidate is selected for the reconstruction of the coding unit. Aspects of the present disclosure provide a method for reconstructing a coding unit coded with a single sample value utilizing one or more coding patterns. A coding pattern includes at least one of the positions of reconstructed boundary neighboring samples of one or more neighboring reconstructed coding units. A boundary neighboring sample is a sample on the boundary of a neighboring coding unit of the coding unit and is immediately adjacent to the coding unit. The position of the boundary neighboring sample in a coding pattern may be predetermined and fixed, and in case there are multiple boundary neighboring sample positions in a coding pattern, the boundary neighboring sample positions may be ordered in a predetermined order. To reconstruct the coding unit, a coding pattern is determined, and a boundary neighboring sample according to the determined coding pattern is selected to fill the coding unit. Embodiments of the present disclosure do not need to construct and maintain a sample candidate list, thus avoiding the pruning processing of the sample candidate list. Embodiments of the present disclosure also provide a candidate pattern that may use fixed positions of the boundary neighboring samples, and thus avoids maintenance of the order of the sample candidates. Embodiments of the present disclosure are amenable to hardware implementation and have nearly no coding loss, with reduced depth map intra coding complexity for hardware implementation.

Figure 1:
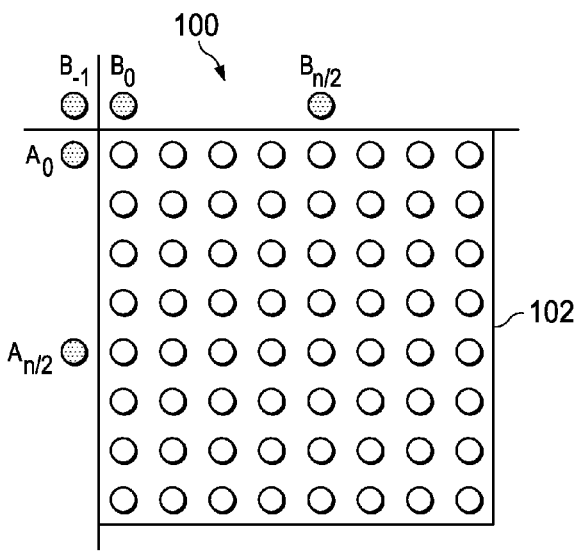
FIG. 1 illustrates a diagram of an embodiment coding unit with spatial sample candidates used to construct a sample candidate list.

A coding unit (CU) coded using the single depth mode may be reconstructed with a single depth sample value, and the depth sample value may be selected, conventionally, from a sample candidate list. The sample candidate list may be constructed by inserting into the candidate list sample candidates derived from reconstructed neighboring samples of the current CU in a predefined order. FIG. 1 illustrates a diagram 100 including an embodiment coding unit 102 coded with the single depth mode. Each circle in FIG. 1 represents a sample or a pixel of the coding unit 102, and the coding unit 102 includes a plurality of samples or pixels, e.g., m*n pixels, where m may be the same as or different from n. FIG. 1 shows an example where m equals n. Throughout this disclosure, the terms of "sample" and "pixel" are used interchangeably. In this example, the coding units above (upper neighbor), on the left (left neighbor) of, and on the upper left (upper-left neighbor) of, the coding unit 102 are neighboring coding units of the coding unit 102 that have been reconstructed. FIG. 1 further shows spatial sample candidates used to construct a candidate list for the CU 102 which is the current coding unit to be reconstructed. Five reconstructed samples from the upper neighbor, the left neighbor and the upper left neighbor of the coding unit 102 are selected as the spatial neighboring samples of the coding unit 102, and are inserted into the candidate list in the order of ($A_{n/2}$, $B_{n/2}$, $B_0$, $A_0$, $B_{-1}$). Each of the five samples is a sample on the boundary of a neighbouring coding unit of the coding unit 102 that have been reconstructed, and is immediately adjacent to the coding unit 102. For example, $A_0$ and $A_{n/2}$ are on the boundary of the left neighbour of the CU 102, $B_0$ and $B_n/2$ are on the boundary of the upper neighbour, and $B_{-1}$ is on the boundary of the upper left neighbour. A sample on the boundary of a coding unit may be referred to as a boundary sample, and a boundary sample of a neighbouring coding unit of a coding unit that is immediately adjacent to the current coding unit may be referred to herein as a boundary neighbouring sample or pixel of the coding unit. For example, samples $A_{n/2}$, $A_0$, $B_{n/2}$, $B_0$, and $B_{-1}$ are the boundary neighbouring samples of the coding unit 102. The size of the candidate list as shown in FIG. 1 is five (5). Alternatively, the sample candidate list may have a size of 2, or 4. Additionally, the sample candidate list may have a fixed size that predetermined. If an empty entry exists in a candidate list after pruning and derivation of the sample candidates from the boundary neighbouring samples, an offset candidate may be derived by adding an offset to a first available sample candidate and may be used to fill in the empty entry. After the sample candidate list is constructed, a candidate index is signalled to indicate which sample candidate in the candidate list is selected to fill the current coding unit 102. If the current coding unit 102 is coded with the single depth mode, no residual may be further coded. Construction of the candidate list as discussed above requires a complicated process and may not be hardware friendly.

In accordance with some embodiments, a coding pattern may be generated and used to select a sample candidate for reconstructing a coding unit coded with a single depth value. A coding pattern may include at least one of the positions of reconstructed boundary neighbouring samples from one or more coding units that have been reconstructed. As discussed above, a boundary neighbouring sample is a boundary sample of a neighbouring coding unit of the coding unit that is immediately adjacent to the coding unit. Each of the boundary neighbouring samples has already been reconstructed, and is at a specific position on a boundary of a neighbouring coding unit. In one embodiment, the number and positions of the boundary neighbouring samples in a coding pattern may be predetermined. One or more coding patterns may be formed for a coding unit to be reconstructed, and each coding pattern may include different boundary neighbouring sample positions. In encoding, one of the coding patterns may be selected and a boundary neighbouring sample in the selected coding pattern may be used to reconstruct the coding unit. A boundary neighbouring sample in a coding pattern may also be referred to as a reference sample or pixel.

Figure 2A:
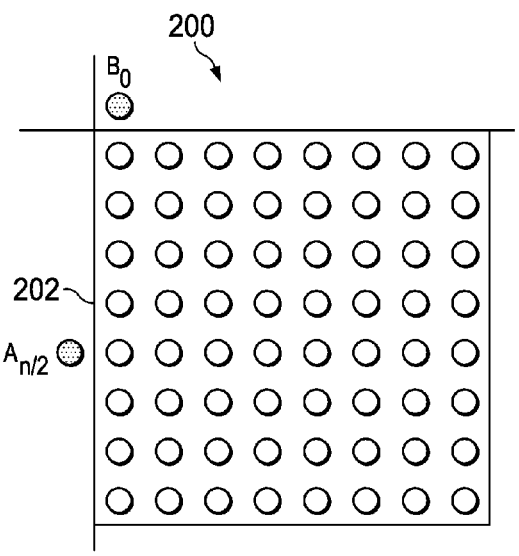
FIG. 2A illustrates a diagram of an embodiment coding unit with a first coding pattern.

FIG. 2A illustrates a diagram 200 including a coding unit 202 coded with the single depth value mode. The coding unit 202 includes m*n pixels, and its upper neighbour and left neighbour, each including m*n reconstructed pixels, have been reconstructed. In the example shown in FIG. 2A and FIG. 2B, m equals n. In the following description, a case of m equal to n is used for illustrative purpose only, and should not be construed to limit the scope of the claims. One of ordinary skill of art would recognize that the embodiments of the present disclosure would also apply to the case where m is not equal to n. In one embodiment, a coding pattern T1 may be formed with two boundary neighbouring samples of the coding unit 202, with each of the boundary neighbouring samples selected from a reconstructed neighbour of the coding unit 202. The positions of the two boundary neighbouring samples may be pre-determined and fixed. In the example shown in FIG. 2A, $A_{n/2}$ and $B_0$ are selected. The boundary neighbouring sample $A_{n/2}$ is selected form the boundary of the left neighbour of the coding unit 202, and its subscript "n/2" indicates the middle position of the reference pixel on the boundary, which means $A_{n/2}$ is a middle boundary pixel on the right boundary of the left neighbour. The reference pixel $B_0$ is selected from the upper neighbour of the coding unit 202, and similarly, the subscript of "0" indicates the position of the reference pixel on the bottom boundary of the upper neighbour of the coding unit 202. As shown, $B_0$ is the left-first pixel, or the first boundary pixel on the bottom boundary of the upper neighbour of the coding unit 202. The two boundary neighbouring samples may be referred to as a candidate pair ($A_{n/2}$, $B_0$). The coding pattern T1 is constructed using the two reference pixels with each at a particular boundary position of a neighbouring coding unit of the coding unit that have been reconstructed. The positions of the two reference pixels may be predetermined so that both an encoding side and a decoding side may have had the information about the positions. To reconstruct the coding unit, a codec or a decoder may simply check whether the samples of the two positions are available, and use a sample value at an available position to fill the coding unit. The number and positions of the boundary neighbouring samples in a coding pattern may be predetermined, FIG. 2A is an example with the coding pattern T1 including two reference pixels with fixed and predetermined pixel positions, i.e., the coding pattern T1 includes two reference pixels ($A_{n/2}$, $B_0$). Alternatively, the number of the positions of the reference pixels included in the coding pattern T1 may vary and may be predetermined. i.e., the coding pattern T1 includes one reference pixel ($A_{n/2}$) or the coding pattern T1 includes one reference pixel ($B_0$). One of ordinary skill in the art would recognize many variations, alternatives and modifications for making such a candidate position from reconstructed neighboring coding units of the coding unit 202.

Figure 2B:
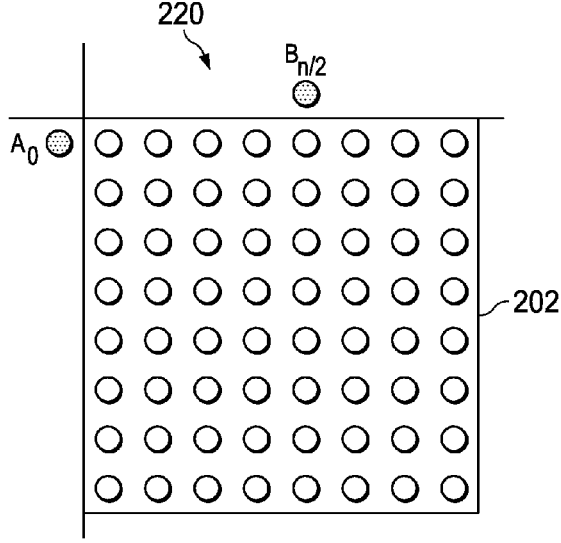
FIG. 2B illustrates a diagram of an embodiment coding unit with a second coding pattern.

In accordance with some embodiments, a second coding pattern T2 may be formed for encoding and decoding the coding unit 202, along with the coding pattern T1. FIG. 2B illustrates a diagram 220 including the coding unit 202 with the second coding pattern T2 constructed using two boundary neighbouring samples $A_0$ and $B_{n/2}$. As discussed above, the reference pixel $A_0$ is selected form the left neighbour of the coding unit 202, and its subscript "0" indicates that it is the upper-first pixel on the right boundary of the left neighbour of the coding unit 202. Similarly, $B_{n/2}$ is a middle pixel on the bottom boundary of the upper neighbour of the coding unit 202. Mechanism may be applied to indicate which coding pattern, i.e., coding pattern T1 or coding pattern T2, is used to code and decode the coding unit 202. In one embodiment, a signal or a flag, e.g., a single_sample_idx, may be used to specify which coding pattern is to be used. For example, in decoding of the coding unit 202, when the flag single_sample_idx=0, the coding pattern T1 will be used for decoding. When the flag single_sample_idx=1, the coding pattern T2 will be used for decoding.

Figure 3:
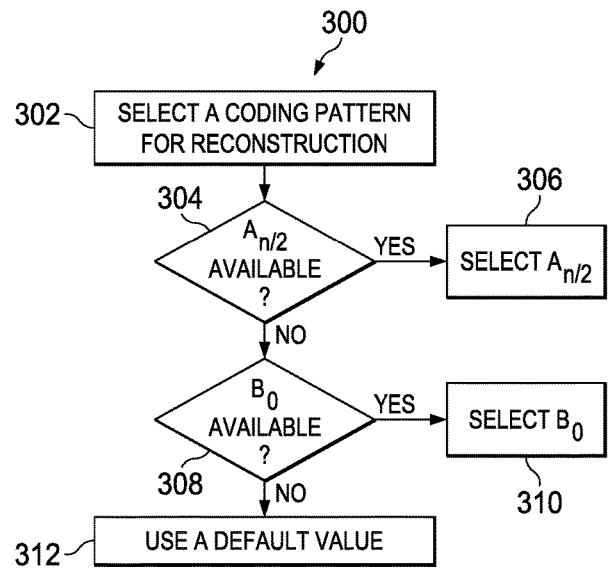
FIG. 3 illustrates a flow chart of an embodiment method for reconstructing a coding unit.

FIG. 3 illustrates an embodiment method 300 for reconstructing the coding unit 202 using the coding patterns T1 and T2. The method 300 determines in Step 302 which coding pattern will be used for reconstruction. If the coding pattern T1 is selected to use, i.e., reference pixels $A_{n/2}$ and $B_0$ are used to reconstruct the coding unit 202, the method 300 may first check the availability of the reference pixel $A_{n/2}$ in Step 304. If $A_{n/2}$ is available, $A_{n/2}$ will be selected to fill the current CU 202 in Step 306. If $A_{n/2}$ is not available, the method 300 may check the availability of the next reference pixel $B_0$ of the coding pattern T1 in Step 308. A reference pixel may be unavailable if the coding unit 202 is a coding block on the first row or a first coding block of a frame partitioned into a plurality of coding blocks. If $B_0$ is available, $B_0$ is selected to fill the current CU 202 in Step 310. If none of $A_{n/2}$ and $B_0$ are available, a default value may be used to the fill the CU 202 in Step 312. For example, a default value 128 (e.g., $2^{bitDepth-1}$ when bitDepth=8, where bitDepth indicates the number of bits used to represent a sample value) may be used to fill the current CU 202. Thus a reference sample for reconstructing a coding unit may be derived without constructing a candidate list. Moreover, the worst case of position checking points is reduced from 5 points to 2 points. In addition, selection of a reference pixel is also consistent with the DC prediction part of Segment-wise DC Coding (SDC) since $B_{-1}$ may be no longer used.

Referring back to FIG. 2A and FIG. 2B, two coding patterns are illustrated with each including two reference pixels with fixed and predetermined pixel positions, i.e., the coding pattern T1 includes two reference pixels ($A_{n/2}$, $B_0$), and the coding pattern T2 includes two reference pixels ($A_0$, $B_{n/2}$). Alternatively, the positions of the two reference pixels included in T1 and T2 may not be limited to what is shown in FIG. 2A and FIG. 2B. Examples of other candidate pairs that may be used to construct the two coding patterns may include ($B_{n-1}$, $A_0$), ($A_{n-1}$, $B_0$); ($B_{n-1}$, $A_{n-4}$), ($A_0$, $B_0$); ($A_0$, $B_{n/2}$), ($B_0$, $A_{n/2}$); ($B_{n/2}$, $A_{n/2}$), ($A_0$, $B_0$); and ($A_{n/2}$, $B_{n/2}$), ($B_0$, $A_0$), etc. Each candidate pair may include one boundary neighboring sample from the left neighbor of the coding unit 202, and one boundary neighboring sample from the upper neighbor of the coding unit 202. One of ordinary skill in the art would recognize many variations, alternatives and modifications for making such a candidate pair from reconstructed neighboring coding units of the coding unit 202.

In accordance with some embodiments, the coding patterns T1 and T2 may each include more than two reference pixels, with each located in a different position on the boundary of a neighbouring coding unit that has been reconstructed. In one embodiment, a coding pattern may have three reference pixels selected from three different positions, e.g. pixels of $A_{n/2}$, $B_{n/2}$ and $B_0$, or four reference pixels selected from four different positions, e.g. pixels of $A_{n/2}$, $B_{n/2}$, $A_0$ and $B_0$. In another embodiment, a coding pattern may include (m+n) reference pixels if a coding unit has m*n pixels. One of ordinary skill in the art would recognize many variations, alternatives and modifications for selecting a plurality of reference pixels to construct a coding pattern.

In accordance with yet some embodiments, multiple coding patterns may be constructed for encoding and decoding a coding unit. For example, three coding patterns, such as ($A_{n/2}$, $B_0$), ($A_0$, $B_{n/2}$) and ($A_{n-1}$, $B_0$), or ($A_{n/2}$), ($B_{n/2}$) and ($B_0$) may be constructed. In another example, four coding patterns, such as ($A_{n/2}$, $B_0$), ($A_0$, $B_{n/2}$), ($A_{n-1}$, $B_0$) and ($B_{n-1}$, $A_0$), or ($A_{n/2}$), ($B_{n/2}$), ($B_0$) and ($A_0$) may be constructed for encoding and decoding. A signal may be sent to a decoding side to indicate which of the plurality of coding patterns is used in encoding, and the decoding side may select the corresponding coding pattern according to the received signal for reconstructing a coding unit.

In accordance with yet some embodiments, when none of the reference pixels in a coding pattern are available, a default value may be used to reconstruct a coding unit. The default value may be 128 (i.e., $2^{bitDepth-1}$ when bitDepth=8), or any other applicable number. One of ordinary skill in the art would recognize many variations of the default value. In one embodiment, a weighted combination of some reference pixels that are available may be calculated as a default value. For example, a default value may be calculate according to a formula of: default value=$a1*p_{x1,y1}+a2*p_{x2,y2}+a3*p_{x3,y3}+\ldots an*p_{xn,yn}$, where a1, a2 ..., an are weighting coefficients, and $p_{x1,y1}$, $p_{x2,y2}$, ..., $p_{xn,yn}$ are available reference pixels at position (x1,y1), (x2,y2), ..., and (xn, yn). The reference pixels may be pre-determined.

In accordance with yet some embodiments, pixels or samples from any positions on the boundary of a reconstructed neighbouring coding of a coding unit to be reconstructed may be selected to construct a coding pattern. In one embodiment, for reconstructing a coding unit 202 in FIG. 2A, a typical position may include $A_0$, $B_0$, $A_{n/2}$, $B_{n/2}$, $A_{n-1}$, $B_{n-1}$, $A_{-1}$, $B_{-1}$, $A_{n/2-1}$, $B_{n/2-1}$, $A_{n/2+1}$ and $B_{n/2+1}$. A sample denoted as $X_{n/2}$ is same as $X_{0.5n}$, and stands for the middle position in a boundary of a reconstructed neighbouring coding unit.

In accordance with yet some embodiment, a coding patter may be represented by a group of positions or a set of positions of a plurality of reference pixels, and be expressed as a Pattern {p0, p1, p2, ..., pk}, where pi, 0≤i≤k represents a predetermined position of a reference pixel, and k is an integer number representing the size of the pattern. For example, the coding pattern T1 illustrated in FIG. 2A may be represented by Pattern 1 {p0, p1}=($A_{n/2}$, $B_0$). The pattern size may be predetermined. For example, a pattern size k of one coding pattern may be 1, 2, 3, 4, 5, or any other number depending on the size of a coding unit and coding design.

In accordance with some embodiments, positions of the reference pixels in a Pattern {p0, p1, p2, ..., pk} may be ordered in a predetermined order. In one embodiment, positions of the reference pixels in a coding pattern may have different priorities, where the first reference pixel p0 always has the highest priority, p1 has the second highest priority, and pk has the lowest priority. Thus, the set of positions in a coding pattern are ordered according to priorities. For example, for a coding pattern represented as Pattern {p0, p1}=($A_{n/2}$, $B_0$), $A_{n/2}$ has higher priority than $B_0$.

In accordance with yet some embodiments, when reference pixels' positions of a coding pattern are ordered, e.g., the reference pixels are ordered from the highest priorities to the lowest priority, signaling of the order of the reference pixels may be simplified, since the order is predetermined and fixed, and the ordering information may be known to both the encoding and decoding sides. Thus when decoding a coding unit, availability of the reference pixels with ordered positions in a coding pattern may be checked one by one based on their position order, e.g., based on their positions priorities, and there is no need to signal and maintain the order of the reference pixels.

When multiple coding patterns are constructed for use in coding, mechanism may be applied to indicate or signal which coding pattern has been used, so that the correct pattern may be used in decoding. For example, each of the multiple coding patterns may be assigned a pattern index, and a pattern index may be signalled into a bitstream of a coding unit to indicate which coding pattern to be used for decoding. In accordance with some embodiments, one of the multiple coding patterns may be selected as a default coding pattern. For example, when two coding patterns are constructed, one of the two coding patterns may be selected as a default pattern. In one embodiment, one bit may be signalled in a bitstream of a coding unit to indicate whether a default pattern is used.

Figure 4:
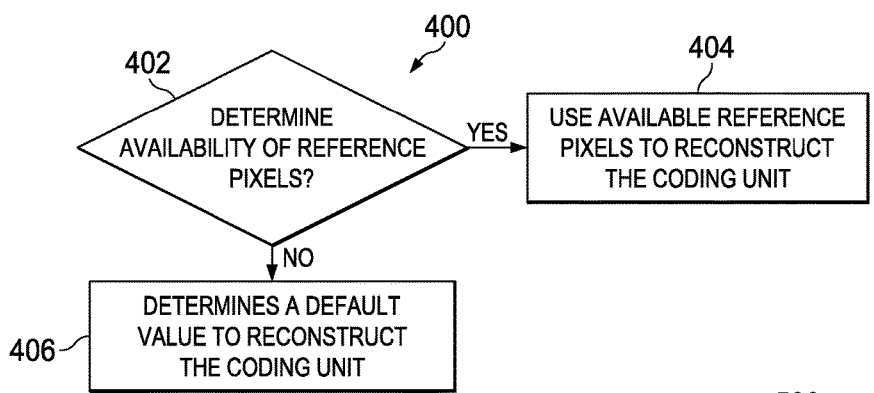
FIG. 4 illustrates a flow chart of another embodiment method for reconstructing a coding unit.

FIG. 4 illustrates an embodiment method 400 of decoding a coding unit using coding patterns. The method 400 determines the availability of the positions of the reference pixels in a coding pattern in Step 402. In one embodiment, the coding pattern may be determined, e.g., selected, according to an index signaled in a bitstream. In one embodiment, if one of the reference pixels is not available, a fixed number e.g., 128, may be used to as the value of the reference pixel that is not available. In one embodiment, reference pixels whose positions are determined to be available may be used to reconstruct the coding unit in Step 404. For example, when only one position is determined to be available, the first position may be used to reconstruct the coding unit. Alternatively, if only two positions are available, the first two positions may be used to reconstruct the current block. If none of the reference pixels in the coding pattern is available, the method determines a default value to reconstruct the coding unit in Step 406, the default value may be 128 (i.e., $2^{bitDepth-1}$ when bitDepth=8), or any other applicable number.

Figure 5:
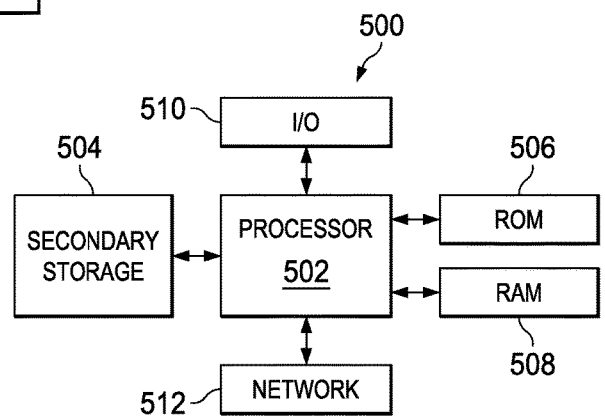
FIG. 5 illustrates a block diagram of an embodiment processing system.

Table 1 shows simulation results of encoding and decoding different pictures using two coding patterns ($A_{n/2}$, $B_0$) and ($A_0$, $B_{n/2}$). Columns (video PSNR/total bitrate) and (synth PSNR/total bitrate) list the average bit-saving for coded views and synthesis views, respectively. Table 1 shows that for 8 test sequences (including three 1024×768 test sequences and five 1920×1088 test sequences), there is generally no coding loss for coded views and negligible coding loss for synthesis views.

power, memory resources, and network throughput capability to handle the necessary workload placed upon it. FIG. 5 illustrates a processing system 500 suitable for implementing one or more embodiments disclosed herein. The processing system 500 includes a processor 502 (which may be referred to as a central processing unit or CPU) that is in communication with non-transitory memory devices including a secondary storage 504, a read only memory (ROM) 506, a random access memory (RAM) 508, input/output (I/O) devices 510, and network connectivity devices 512. The processor 502 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 502 may be configured to implement embodiments described herein.

The secondary storage 504 is typically comprised of one or more disk drives or tape drives and is used for non-volatile storage of data and as an over-flow data storage device if RAM 508 is not large enough to hold all working data. The secondary storage 504 may be used to store programs that are loaded into the RAM 508 when such programs are selected for execution. The ROM 506 is used to store instructions and perhaps data that are read during program execution. The ROM 506 is a non-volatile memory device that typically has a small memory capacity relative to the larger memory capacity of the secondary storage 504. The RAM 508 is used to store volatile data and perhaps to store instructions. Access to both the ROM 506 and RAM 508 is typically faster than to the secondary storage 504.

The I/O devices 510 may include a video monitor, a liquid crystal display (LCD), a touch screen display, or other type of video display for displaying videos, and may also include a video recording device for capturing videos. The video display may have a resolution of 1920×1080 pixels, 1280×720 pixels, 960×540 pixels, or 480×270 pixels, or any other type of suitable resolution. The I/O devices 510 may also include one or more keyboards, mice, or track balls, or other well-known input devices.

The network connectivity devices 512 may serve as an output and/or input device of the processing system 500. The network connectivity devices 512 may take the form of modems, modem banks, Ethernet cards, universal serial bus (USB) interface cards, serial interfaces, token ring cards,

TABLE 1

| | video 0 | video 1 | video 2 | video PSNR/ video bitrate | video PSNR/ total bitrate | synth PSNR/ total bitrate | enc time | dec time | ren time |
|---|---|---|---|---|---|---|---|---|---|
| Balloons | 0.00% | 0.00% | 0.00% | 0.00% | 0.01% | 0.02% | 99.3% | 98.3% | 101.8% |
| Kendo | 0.00% | 0.00% | 0.00% | 0.00% | −0.02% | 0.00% | 98.5% | 111.8% | 104.4% |
| Newspaper_CC | 0.00% | 0.00% | 0.00% | 0.00% | 0.00% | −0.02% | 98.2% | 97.5% | 99.9% |
| GT_Fly | 0.00% | 0.00% | 0.00% | 0.00% | −0.01% | 0.03% | 99.7% | 103.0% | 102.1% |
| Poznan_Hall2 | 0.00% | 0.00% | 0.00% | 0.00% | 0.00% | 0.03% | 96.2% | 99.0% | 98.8% |
| Poznan_Street | 0.00% | 0.00% | 0.00% | 0.00% | 0.02% | 0.06% | 99.4% | 99.8% | 99.5% |
| Undo_Dancer | 0.00% | 0.00% | 0.00% | 0.00% | −0.03% | 0.01% | 96.6% | 96.5% | 99.8% |
| Shark | 0.00% | 0.00% | 0.00% | 0.00% | 0.00% | 0.01% | 100.2% | 99.6% | 99.9% |
| 1024 × 768 | 0.00% | 0.00% | 0.00% | 0.00% | 0.00% | 0.00% | 98.7% | 102.6% | 102.0% |
| 1920 × 1088 | 0.00% | 0.00% | 0.00% | 0.00% | 0.00% | 0.03% | 98.4% | 99.6% | 100.0% |
| average | 0.00% | 0.00% | 0.00% | 0.00% | 0.00% | 0.02% | 198.5% | 100.7% | 100.8% |

At least some of the features, methods, or video coders, such as the embodiments as described herein may be implemented on a processing system, such as a computer, or a network component, or a node with sufficient processing fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 512 may enable the processor 502 to communicate with an Internet and/or one or more intranets and/or one or more client devices. The network connectivity devices 512 may transmit and/or receive outputs from video codecs. The I/O devices 510 and/or network connectivity devices 512 may be optional if the processing system 500 has stored in a memory device, such as secondary storage 504, a video to be compressed or decompressed.

It is understood that by programming and/or loading executable instructions onto the processing system 500, at least one of the processor 502, the ROM 506, and the RAM 508 are changed, transforming the processing system 500 in part into a particular machine or apparatus, e.g., a service unit, drop point or a CPE, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent changes may be preferred to be implemented in software, because re-spinning a hardware implementation is more expensive than re-spinning a software design. Generally, a design that is stable and that may be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
    selecting, by a processing system, a coding pattern from a plurality of coding patterns for decoding a coding unit that has been coded with a single sample value, each of the plurality of coding patterns being predetermined to indicate one or more reference samples from which a reference sample can be selected for coding the coding unit, and each of the one or more reference samples being located in a predetermined position in a neighboring coding unit of the coding unit, wherein each of the one or more reference samples is a boundary neighboring sample in a corresponding neighboring coding unit and has been reconstructed; and
    decoding, by the processing system, the coding unit according to a value of a first reference sample indicated by the selected coding pattern.

2. The method of claim 1, further comprising determining, by the processing system, availability of the first reference sample indicated by the selected coding pattern.

3. The method of claim 1, further comprising decoding the coding unit according to a default value, when the one or more reference samples of the selected coding pattern are not available.

4. The method of claim 3, wherein the default value is predetermined or calculated.

5. The method of claim 1, wherein decoding the coding unit comprises:
    filling the coding unit using the value of the first reference sample indicated by the selected coding pattern.

6. The method of claim 1, wherein each of the plurality of coding patterns comprises a first boundary neighboring sample located in a first predetermined position in a first neighboring coding unit of the coding unit that has been reconstructed, and a second boundary neighboring sample located in a second predetermined position in a second neighboring coding unit of the coding unit that has been reconstructed.

7. The method of claim 6, wherein the first boundary neighboring sample comprises a first boundary sample, a middle boundary sample, or a last boundary sample of the first neighboring coding unit.

8. The method of claim 6, wherein the second boundary neighboring sample comprises a first boundary sample, a middle boundary sample, or a last boundary sample of the second neighboring coding unit.

9. The method of claim 1, wherein the one or more reference samples of each of the plurality of coding patterns are ordered in a predetermined order.

10. The method of claim 9, wherein the one or more reference samples are ordered according to priority of the one or more reference samples with respect to their positions.

11. The method of claim 1, wherein one of the plurality of coding patterns is a default coding pattern.

12. The method of claim 1, further comprising receiving a signal indicating which of the plurality of coding patterns is to be selected.

13. An apparatus comprising:
    a non-transitory memory storage comprising instructions; and
    one or more processors in communication with the memory storage, wherein the one or more processors execute the instructions to:
    select a coding pattern from a plurality of coding patterns for decoding a coding unit that has been coded with a single sample value, each of the plurality of coding patterns being predetermined to indicate one or more reference samples from which a reference sample can be selected for coding the coding unit, and each of the one or more reference samples being located in a predetermined position in a neighboring coding unit of the coding unit, wherein each of the one or more reference samples is a boundary neighboring sample in a corresponding neighboring coding unit and has been reconstructed; and decode the coding unit according to a value of a first reference sample indicated by the selected coding pattern.

14. The apparatus of claim 13, wherein the one or more processors execute the instructions to further determine availability of the first reference sample indicated by the selected coding pattern.

15. The apparatus of claim 13, wherein the one or more processors execute the instructions to further decode the coding unit according to a default value, when the one or more reference samples of the selected coding pattern are not available.

16. The apparatus of claim 13, wherein each of the plurality of coding patterns comprises a first boundary neighboring sample located in a first predetermined position in a first neighboring coding unit of the coding unit that has been reconstructed, and a second boundary neighboring sample located in a second predetermined position in a second neighboring coding unit of the coding unit that has been reconstructed.

17. The apparatus of claim 13, wherein the one or more reference samples in each of the plurality of coding patterns are ordered in a predetermined order.

18. The apparatus of claim 17, wherein the one or more reference samples are ordered according to priority of the one or more reference samples with respect to their positions.

19. The apparatus of claim 13, wherein one of the plurality of coding patterns is a default coding pattern.

20. The apparatus of claim 13, wherein the one or more processors execute the instructions to further receive a signal indicating which of the plurality of coding patterns is to be selected.

* * * * *